(12) United States Patent
Takanohashi et al.

(10) Patent No.: US 9,952,721 B2
(45) Date of Patent: Apr. 24, 2018

(54) TOUCH PANEL, INFORMATION RECORDING MEDIUM, AND INFORMATION ACQUISITION METHOD

(71) Applicant: Sony Corporation, Tokyo (JP)

(72) Inventors: Kazukuni Takanohashi, Tokyo (JP); Haruo Togashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 456 days.

(21) Appl. No.: 14/448,446

(22) Filed: Jul. 31, 2014

(65) Prior Publication Data

US 2015/0042609 A1 Feb. 12, 2015

(30) Foreign Application Priority Data

Aug. 8, 2013 (JP) ................................ 2013-164860

(51) Int. Cl.
*G06F 3/044* (2006.01)
*G06F 3/041* (2006.01)
*G06F 3/0488* (2013.01)

(52) U.S. Cl.
CPC .............. *G06F 3/044* (2013.01); *G06F 3/041* (2013.01); *G06F 3/0416* (2013.01); *G06F 3/04883* (2013.01); *G06F 2203/04104* (2013.01)

(58) Field of Classification Search
CPC combination set(s) only.
See application file for complete search history.

(56) References Cited

U.S. PATENT DOCUMENTS

| | | | |
|---|---|---|---|
| 2007/0062852 A1* | 3/2007 | Zachut ................ | A63F 3/00643 209/683 |
| 2010/0045627 A1* | 2/2010 | Kennedy ............... | G06F 3/0416 345/173 |
| 2010/0073301 A1* | 3/2010 | Yousefpor ............... | G06F 3/044 345/173 |
| 2013/0205156 A1* | 8/2013 | Niitsuma .............. | G06F 1/3287 713/324 |

FOREIGN PATENT DOCUMENTS

JP 2011-154453 8/2011

* cited by examiner

*Primary Examiner* — Jennifer Mehmood
*Assistant Examiner* — Sosina Abebe
(74) *Attorney, Agent, or Firm* — K&L Gates LLP

(57) ABSTRACT

A touch panel includes: a touch detection device; a map generation section configured to generate a first data map including a fixed pattern and a data pattern, based on a signal output from the touch detection device according to an information recording medium placed in proximity to the touch detection device; and a data acquisition section configured to identify the fixed pattern, and acquire a data code from the data pattern, based on a result of identifying the fixed pattern.

6 Claims, 11 Drawing Sheets

TOUCH PANEL, INFORMATION RECORDING MEDIUM, AND INFORMATION ACQUISITION METHOD

CROSS REFERENCES TO RELATED APPLICATIONS

The present application claims priority to Japanese Priority Patent Application JP 2013-164860 filed in the Japan Patent Office on Aug. 8, 2013, the entire content of which is hereby incorporated by reference.

BACKGROUND

The present disclosure relates to a touch panel that detects an object in contact therewith or in proximity thereto, an information recording medium from which information is read by a touch panel, and an information acquisition method.

Recently, touch panels are mounted in various electronic apparatuses including portable information terminals such as smartphones, portable game machines, personal computers, and the like. In these electronic apparatuses, a keyboard, a button, and the like that have been used are not necessary; therefore, downsizing of the electronic apparatuses is achievable. Moreover, various user interfaces specific to touch panels have been developed, and users are allowed to intuitively perform information input and operations. Accordingly, user interfaces of touch panels are of increasing importance.

Incidentally, there are apparatuses configured to read information that are one-dimensionally or two-dimensionally arranged. For example, Japanese Unexamined Patent Application Publication No. 2011-154453 discloses a recorded information reading apparatus configured to read a pattern that has a conductive material and is recorded on an information recording card.

SUMMARY

Typically, it is desirable that electronic apparatuses have a large number of functions, and touch panels are also expected to have a large number of functions.

It is desirable to provide a touch panel having a large number of functions, an information recording medium, and an information acquisition method.

According to an embodiment of the present disclosure, there is provided a touch panel including: a touch detection device; a map generation section configured to generate a first data map including a fixed pattern and a data pattern, based on a signal output from the touch detection device according to an information recording medium placed in proximity to the touch detection device; and a data acquisition section configured to identify the fixed pattern, and acquire a data code from the data pattern, based on a result of identifying the fixed pattern.

According to an embodiment of the present disclosure, there is provided an information recording medium including: a first recording portion in which a plurality of conductors are arranged in a fixed pattern; and a second recording portion in which one or a plurality of conductors are arranged in a pattern corresponding to recording data.

According to an embodiment of the present disclosure, there is provided an information acquisition method including: generating a first data map including a fixed pattern and a data pattern, based on a signal output from a touch detection device according to an information recording medium placed in proximity to the touch detection device; and identifying the fixed pattern, and acquiring a data code from the data pattern, based on a result of identifying the fixed pattern.

In the touch panel, the information recording medium, and the information acquisition method according to the embodiments of the present disclosure, the first data map is generated, based on the output signal from the touch detection device, and the data code is acquired from the data pattern. At this time, the data code is acquired from the data pattern, based on the result of identifying the fixed pattern.

In the touch panel, the information recording medium, and the information acquisition method according to the embodiments of the disclosure, the fixed pattern is identified, and the data code is acquired from the data pattern, based on the result of identifying the fixed pattern; therefore, a large number of functions are achievable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the technology, and are incorporated in and constitute a part of this specification. The drawings illustrate embodiments and, together with the specification, serve to explain the principles of the technology.

DETAILED DESCRIPTION

Figure 1:
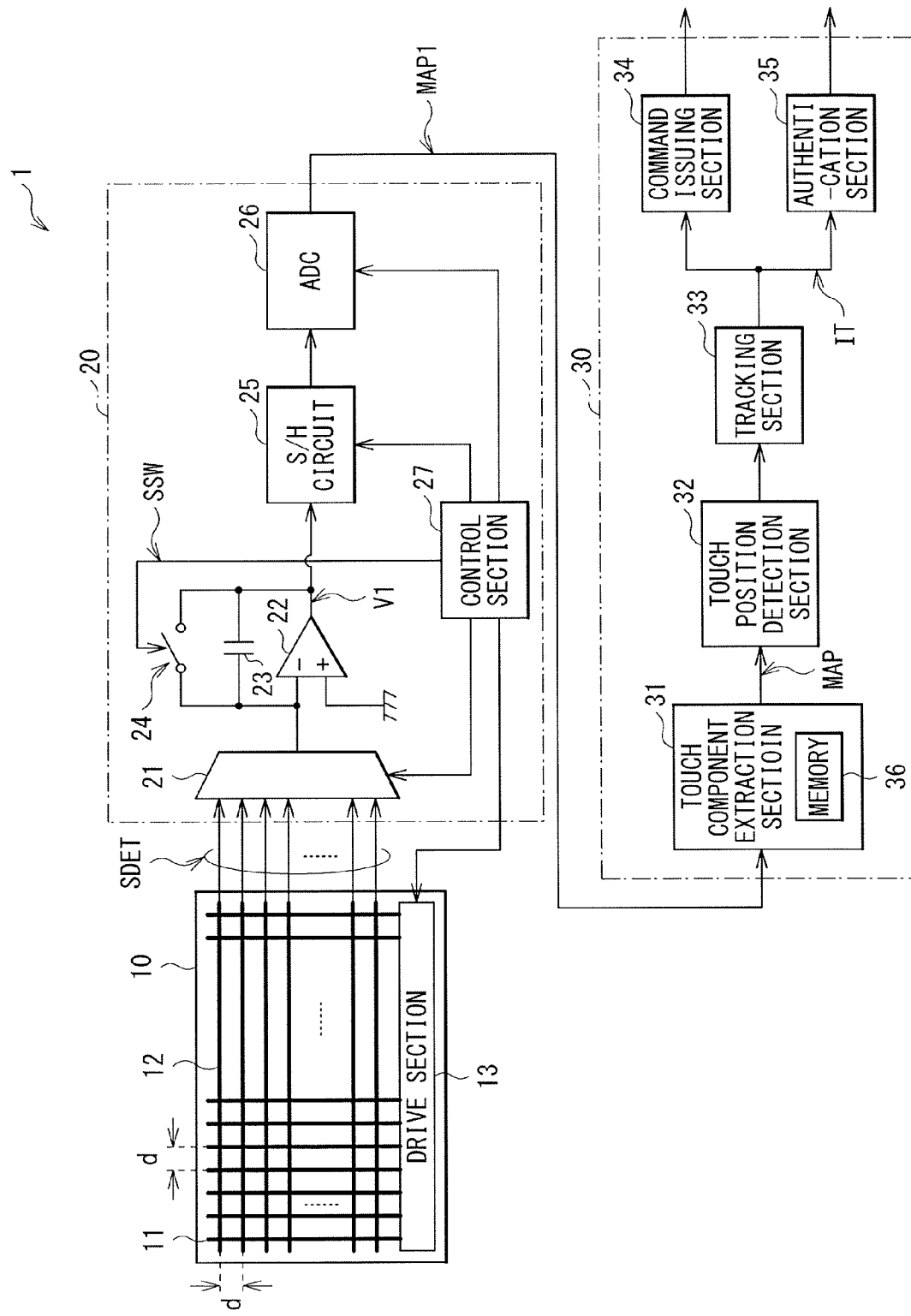
FIG. 1 is a block diagram illustrating a configuration example of a touch panel according to an embodiment of the present disclosure.

Some embodiments of the present disclosure will be described in detail below referring to the accompanying drawings. It is to be noted that description will be given in the following order.
1. Embodiment
2. Application Examples 1. Embodiment Configuration Example FIG. 1 illustrates a configuration example of a touch panel according to an embodiment. The touch panel 1 is a capacitance touch panel. It is to be noted that an information recording medium and an information acquisition method according to embodiments of the present disclosure are embodied by this embodiment, and will be also described below. The touch panel 1 includes a touch detection device 10, an analog signal processing section 20, and a digital signal processing section 30.

The touch detection device 10 is configured to detect an object (an external proximity object) in contact with or in proximity to a touch detection surface thereof, for example, a human finger or an authentication card 9 that will be described later. The touch detection device 10 includes a plurality of drive electrodes 11, a plurality of sensor electrodes 12, and a drive section 13.

The plurality of drive electrodes 11 are electrodes with a strip-like shape, and are arranged side by side at a pitch d in a direction intersecting with an extending direction of the drive electrodes 11. An end of each of the drive electrodes 11 is connected to the drive section 13 so as to allow a drive signal DRV to be applied to each of the drive electrodes 11.

The plurality of sensor electrodes 12 are electrodes extending in a direction intersecting with the extending direction of the plurality of drive electrodes 11, and are arranged side by side at the pitch d in a direction intersecting with the extending direction of the sensor electrodes 12. In other words, in this example, the sensor electrodes 12 are arranged side by side at the same pitch as the pitch of the drive electrodes 11. As will be described later, capacitance is formed at intersections of the plurality of drive electrodes 11 and the plurality of sensor electrodes 12. An end of each of the sensor electrodes 12 is connected to the analog signal processing section 20.

The drive section 13 is configured to sequentially apply the drive signal DRV to the plurality of drive electrodes 11, based on a control signal supplied from the analog signal processing section 20.

Figure 2:
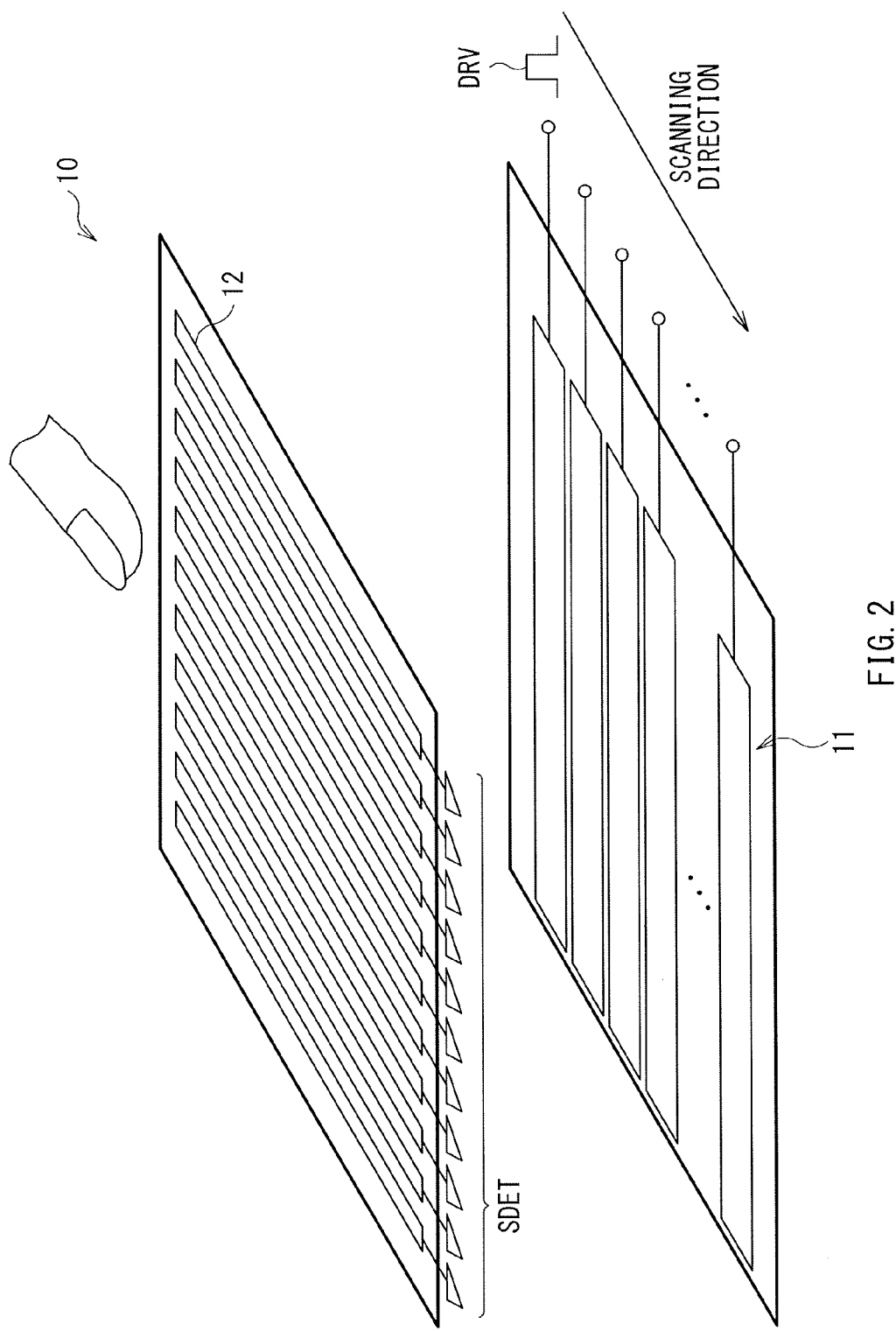
FIG. 2 is a perspective view illustrating a configuration example of a touch detection device illustrated in FIG. 1.

FIG. 2 is a perspective view of a configuration example of the touch detection device 10. In this example, the drive electrodes 11 are provided so as to extend in a horizontal direction in the diagram, and the sensor electrodes 12 are provided so as to extend in a depth direction in the diagram. The drive electrodes 11 and the sensor electrodes 12 are formed in different layers separated from each other. Thus, the capacitance is formed at the intersections of the plurality of drive electrodes 11 and the plurality of sensor electrodes 12.

The drive signal DRV is sequentially supplied to the drive electrodes 11 by the drive section 13 to perform a scanning drive. The drive signal DRV is transmitted to the sensor electrodes 12 through the capacitance between the drive electrodes 11 and the sensor electrodes 12. At this time, a signal (a detection signal SDET) generated in the sensor electrode 12 corresponds to a proximity state of the external proximity object. In other words, in a case where the external proximity object is present, in addition to the capacitance between the drive electrodes 11 and the sensor electrodes 12, capacitance is also formed between the sensor electrode 12 and the external proximity object; therefore, the detection signal SDET is changed depending on the proximity state of the external proximity object. The analog signal processing section 20 and the digital signal processing section 30 are configured to detect the external proximity object, based on such a detection signal SDET.

Thus, in the touch detection device 10, each of intersections of the plurality of drive electrodes 11 and the plurality of sensor electrodes 12 functions as a capacitance touch sensor. In the touch detection device 10, such touch sensors are arranged in a matrix form. Therefore, a position (coordinates) where the external proximity object touches or comes close is detectable by scanning the entire touch detection surface of the touch detection device 10.

The analog signal processing section 20 is configured to generate map data MAP1 indicating detection results by all touch sensors of the touch detection device 10, based on the detection signals SDET supplied from the plurality of sensor electrodes 12 of the touch detection device 10. The analog signal processing section 20 includes a multiplexer 21, an operational amplifier 22, a capacitor 23, a switch 24, a S/H (Sample/Hold) circuit 25, an ADC (Analog to Digital Converter) 26, and a control section 27.

The multiplexer 21 is configured to sequentially select and output one of the detection signals SDET supplied from the plurality of sensor electrodes 12 of the touch detection device 10, based on a control signal supplied from the control section 27. It is to be noted that the analog signal processing section 20 is not limited thereto. Alternatively, for example, instead of providing the multiplexer 21, for example, the same number of circuits such as operational amplifiers 22 as the number of the sensor electrodes 12 of the touch detection device 10 may be provided to perform parallel processing.

The operational amplifier 22 is configured to amplify and output a difference voltage between a voltage at a positive input terminal and a voltage at a negative input terminal. The positive input terminal is grounded in this example. The negative input terminal is connected to an output terminal of the multiplexer 21, and is connected to a first end of the capacitor 23 and a first end of the switch 24. An output terminal of the operational amplifier 22 is connected to a second end of the capacitor 23 and a second end of the switch 24. The first end of the capacitor 23 is connected to the negative input terminal of the operational amplifier 22, and the second end of the capacitor 23 is connected to the output terminal of the operational amplifier 22. The switch 24 is configured to be turned on or off in response to a control signal SSW supplied from the control section 27, and the first end of the switch 24 is connected to the negative input terminal of the operational amplifier 22, and the second end of the switch 24 is connected to the output terminal of the operational amplifier 22.

In this configuration, the operational amplifier 22 and the capacitor 23 integrate the detection signal SDET supplied from the touch detection device 10, and output an integral value obtained thereby as a signal V1 in a period in which the switch 24 is turned off. Then, when the switch 24 is turned on, both ends of the capacitor 23 are electrically connected to each other to reset the integral value (the output signal V1 from the operational amplifier 22).

The S/H circuit 25 is configured to perform sampling of the output signal V1 from the operational amplifier 22 and hold a result of the sampling for a predetermined period, based on a control signal supplied from the control section 27.

The ADC 26 is configured to convert an output signal from the S/H circuit 25 that is an analog signal into a digital code, based on a control signal supplied from the control section 27.

The control section 27 is a circuit configured to supply control signals to the drive section 13, the multiplexer 21, the switch 24, the S/H circuit 25, and the ADC 26 of the touch detection device 10 and control these circuits so as to allow these circuits to operate cooperatively with one another.

Figure 3:
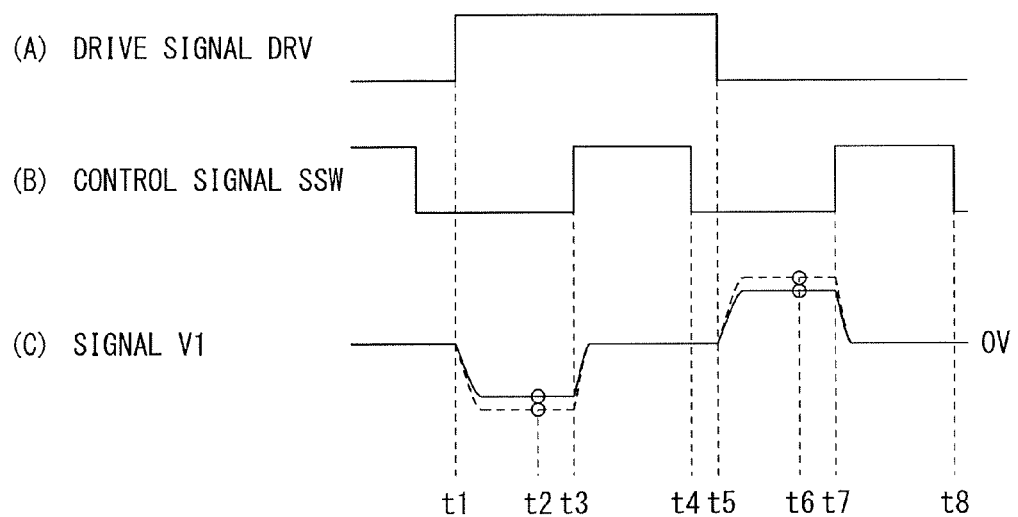
FIG. 3 is a timing waveform diagram illustrating an operation example of the touch detection device and an analog signal processing section illustrated in FIG. 1.

FIG. 3 illustrates an operation example in the touch detection device 10 and the analog signal processing section 20, where a part (A) indicates a waveform of the drive signal DRV, a part (B) indicates a waveform of the control signal SSW, and a part (C) indicates a waveform of the signal V1. In this example, the switch 24 is turned on in a case where the control signal SSW is at a high level, and is turned off in a case where the control signal SSW is at a low level. Moreover, in the part (C) in FIG. 3, a solid line indicates a waveform in a case where the external proximity object is present, and a broken line indicates a wavelength in a case where the external proximity object is not present.

First, at a timing t1, the drive section 13 transitions a voltage of the drive signal DRV that is to be applied to a given drive electrode 11 of the plurality of drive electrodes 11 from the low level to the high level (refer to the part (A) in FIG. 3). This drive signal DRV is transmitted to the sensor electrode 12 through the capacitance between the drive electrode 11 and the sensor electrode 12, and is output as the detection signal SDET from the touch detection device 10. Then, the operational amplifier 22 and the capacitor 23 integrate the detection signal SDET to reduce the output signal V1, thereby turning the output signal V1 to a voltage corresponding to the proximity state of the external proximity object (refer to the part (C) in FIG. 3).

Then, at a timing t2, the S/H circuit 25 samples the signal V1, and the ADC 26 converts the output signal from the S/H circuit 25 into a digital code (refer to the part (C) in FIG. 3).

Next, at a timing t3, the control section 27 changes a voltage of the control signal SSW from the low level to the high level (refer to the part (B) in FIG. 3). Accordingly, the switch 24 is turned on, and the output signal V1 from the operational amplifier 22 is set to 0 V to reset the integral value (refer to the part (C) in FIG. 3).

Then, at a timing t4, the control section 27 changes the voltage of the control signal SSW from the high level to the low level (refer to the part (B) in FIG. 3). Accordingly, the switch 24 is turned off, and the operational amplifier 22 and the capacitor 23 are allowed to perform an integral action.

Next, at a timing t5, the drive section 13 transitions the voltage of the drive signal DRV from the high level to the low level (refer to the part (A) in FIG. 3). Accordingly, the operational amplifier 22 and the capacitor 23 integrate the detection signal SDET in a similar way to a way from the timing t1 to turn the signal V1 to the voltage corresponding to the proximity state of the external proximity object, and at a timing t6, the S/H circuit 25 samples the signal V1, and the ADC 26 converts the output signal from the S/H circuit 25 into a digital code (refer to the part (C) in FIG. 3). Then, in a period from a timing t7 to a timing t8, the integral value is reset (refer to the part (C) in FIG. 3).

Thus, the analog signal processing section 20 generates digital codes, based on the detection signals SDET in the respective touch sensors of the touch detection device 10. Then, the analog signal processing section 20 outputs these digital codes as the map data MAP1 configured of the digital codes of all of the touch sensors in the touch detection surface.

The digital signal processing section 30 is configured to perform predetermined processing, based on the map data MAP1 supplied from the analog signal processing section 20. The digital signal processing section 30 has two operation modes (a touch detection mode M1 and an authentication mode M2) in this example. These operation modes are indicated by an application in an electronic apparatus including the touch panel 1. For example, in a case where the touch panel 1 is mounted in a smartphone, when a normal operation such as mail and web browsing is to be performed, the application instructs the digital signal processing section 30 to operate in the touch detection mode M1. Moreover, when authentication is performed by holding the authentication card 9 (that will be described later) over the touch detection surface of the touch panel 1, the application instructs the digital signal processing section 30 to operate in the authentication mode M2. In the touch detection mode M1, the digital signal processing section 30 determines, based on the map data MAP1, the number of touches, a touch position, a change in each touch position, and the like to issue a command. Moreover, in the authentication mode M2, as will be described later, the digital signal processing section 30 acquires an authentication code CC from the authentication card 9 held over the touch detection surface, and performs authentication with use of the authentication code CC.

The digital signal processing section 30 includes a touch component extraction section 31, a touch position detection section 32, a tracking section 33, a command issuing section 34, and an authentication section 35.

The touch component extraction section 31 is configured to generate, based on the map data MAP, map data MAP of a component (a touch component TC) based on the external proximity object. The touch component extraction section 31 includes a memory 36. The memory 36 is configured to hold map data MAP0 in a case where the external proximity object is not present. In this configuration, first, the touch component extraction section 31 stores, in the memory 36 in advance, map data indicating absence of the external proximity object as the map data MAP0 of the map data MAP1 supplied from the analog signal processing section 20. Then, the touch component extraction section 31 determines a difference between each digital code in the map data MAP1 supplied from the analog signal processing section 20 and each digital code in the map data MAP0 stored in the memory 36. Then, the touch component extraction section 31 calculates, based on the difference, the touch component TC whose value is close to 0 (zero) in a case where the external proximity object is not present and is increased when the external proximity object comes closer, thereby generating the map data MAP.

The touch position detection section 32 is configured to detect the number of touches, the touch position, and the like, based on the map data MAP.

The tracking section 33 is configured to perform, in the touch detection mode M1, tracking processing, based on information such as the number of touches and the touch position detected in the touch position detection section 32, thereby determining a change in each touch position. Then, the tracking section 33 supplies information about the number of touches and the touch position and information about the change in each touch position as touch information IT to the command issuing section 34 and the authentication section 35.

Moreover, in this example, the tracking section 33 supplies information supplied from the touch position detection section 32 as it is as the touch information IT to the command issuing section 34 and the authentication section 35 in the authentication mode M2. It is to be noted that the tracking section 33 is not limited thereto, and the tracking section 23 may perform tracking processing in the authentication mode M2 as with the touch detection mode M1.

The command issuing section 34 is configured to perform gesture recognition based on the touch information and issue a command in the touch detection mode M1.

The authentication section 35 is configured to perform authentication based on the touch information IT in the authentication mode M2.

Figure 4:
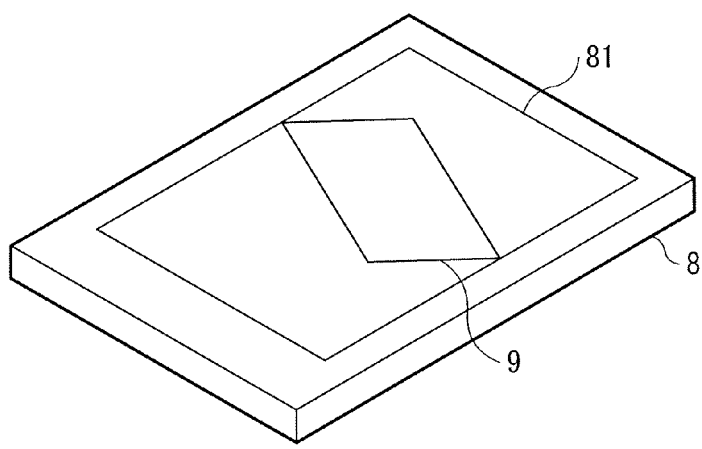
FIG. 4 is a perspective view illustrating an operation example in an authentication mode.
Figure 5:
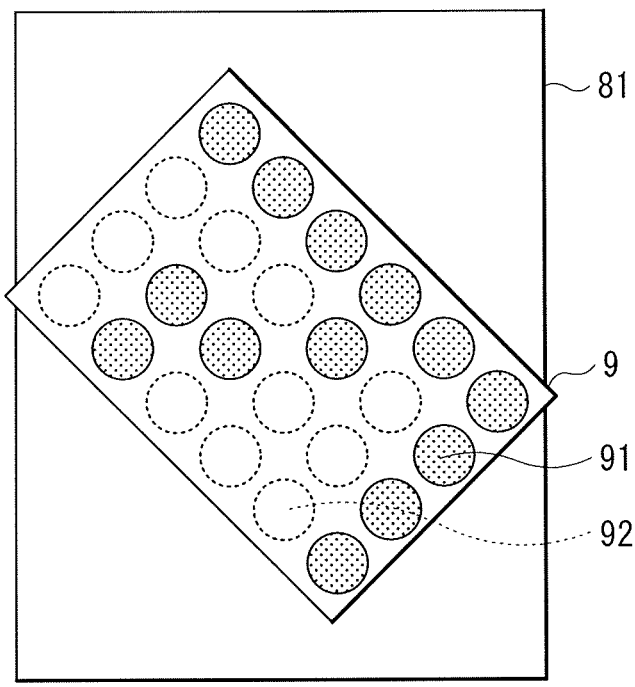
FIG. 5 is a plan view illustrating an operation example in the authentication mode.

FIGS. 4 and 5 illustrate an operation example in the authentication mode M2. In this example, the touch panel 1 is mounted in a smartphone 8. Then, the authentication card 9 is held over a display surface/touch detection surface 81 of the smartphone 8.

In this example, the authentication card 9 is a prepaid card on which an authentication code CC is recorded. For example, a user may purchase a product using an electronic apparatus (for example, the smartphone 8) including the touch panel 1 by performing authentication with use of the authentication code CC of the authentication card 9. The authentication card 9 includes a conductor 91 and a nonconductor 92. In this example, the conductor 91 and the nonconductor 92 are formed in an internal layer of the authentication card 9, and are not visible from outside. In this example, each of the conductor 91 and the nonconductor 92 has a circular shape.

Figure 6:
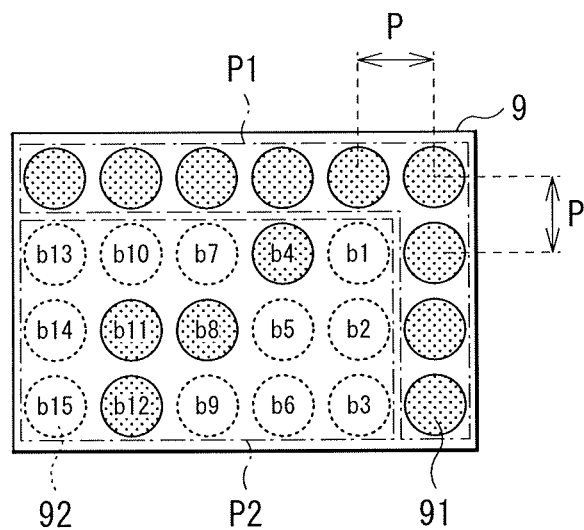
FIG. 6 is an explanatory diagram illustrating an example of an arrangement pattern of a conductor and a nonconductor.

FIG. 6 illustrates an arrangement pattern of the conductors 91 and the nonconductors 92. In FIG. 6, an arrangement pattern viewed from a front surface (a surface opposite to a surface in contact with the touch panel 1) of the authentication card 9 is illustrated. In this example, the conductor 91 and the nonconductor 92 are selectively formed so as to form a matrix (6×4) with six horizontal lines by four vertical lines. The conductor 91 and the nonconductor 92 are formed at a pitch P in a vertical direction and a horizontal direction in FIG. 6. It is to be noted that the matrix is not limited thereto, and the number of horizontal lines may be other than 6, and the number of vertical lines may be other than 4. Moreover, the conductor 91 and the nonconductor 92 may be arranged in a so-called close-packed arrangement.

The conductor 91 and the nonconductor 92 configure a synchronization pattern P1 and a data pattern P2. The synchronization pattern P1 is a pattern for allowing the authentication section 35 to determine a position where the authentication card 9 is held over in the touch detection surface and the orientation of the authentication card 9, and is a predetermined pattern. The data pattern P2 is a pattern in which the authentication code CC configured of a plurality of bits (15 bits in this example) is recorded. In this example, the synchronization pattern P1 is configured of eight conductors 91 in total in a top portion and a right portion in FIG. 6. Moreover, the data pattern P2 is configured of the conductor 91 and the nonconductor 92 other than the conductors 91 configuring the synchronization pattern P1. In other words, in this example, the data pattern P2 is configured by selectively forming the conductors 91 and the nonconductors 92 at fifteen (3×5) addresses. Bits b1 to b15 of the authentication code CC (b1, b2, b3, ..., b15) are assigned to these fifteen addresses, respectively, and the authentication code CC is recorded based on which one of the conductor 91 and the nonconductor 92 is formed at each address. More specifically, in a case where the conductor 91 is formed in a given address, a bit corresponding to the address is "1", and in a case where the nonconductor 92 is formed in the given address, the bit is "0". In this case, the authentication code CC represented by the data pattern P2 illustrated in FIG. 6 is "000100010011000".

To allow the touch panel 1 to properly detect the synchronization pattern P1 and the data pattern P2 in the authentication card 9, it is necessary to satisfy a condition of a sampling theorem. A relationship between the pitch P of the conductor 91 and the nonconductor 92 and the pitch d of the drive electrodes 11 and the sensor electrodes 12 to satisfy the condition of the sampling theorem will be described below.

Figure 7:
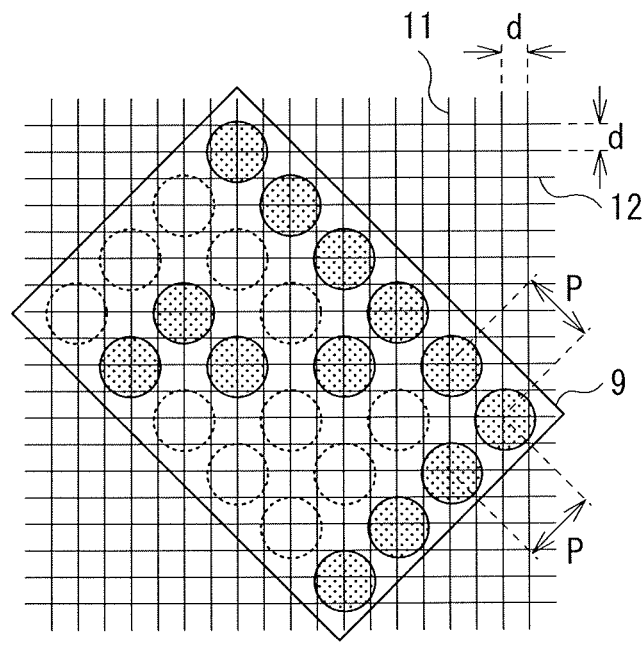
FIG. 7 is an explanatory diagram for describing a sampling theorem.
Figure 8:
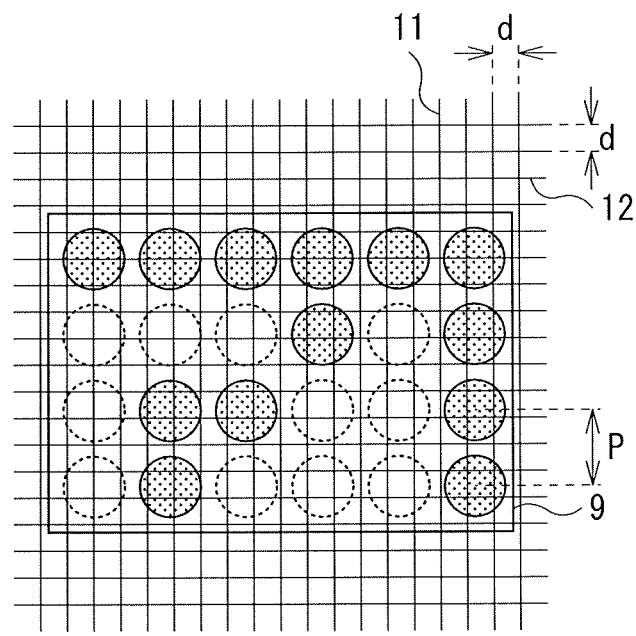
FIG. 8 is another explanatory diagram for describing the sampling theorem.

FIGS. 7 and 8 illustrate the relationship between the pitch P and the pitch d. FIG. 7 illustrates a case (a case C1) where the authentication card 9 is held over the touch detection surface so as to orient a long-side direction of the authentication card in a direction of about 45° with respect to the extending direction of the sensor electrodes 12, and FIG. 8 illustrates a case (a case C2) where the authentication card 9 is held over the touch detection surface so as to orient the long-side direction of the authentication card 9 parallel to the extending direction of the sensor electrodes 12. In this example, the pitch P and the pitch d are determined so as to satisfy the following expression.

$$P=2\sqrt{2}d \quad (1)$$

When the pitch P and the pitch d are determined in such a manner, as illustrated in FIGS. 7 and 8, the condition of the sampling theorem is allowed to be satisfied in the long-side direction and a short-side direction of the authentication card 9. At this time, for example, density of intersections (touch sensors) of the drive electrodes 11 and the sensor electrodes 12 is lower in the case C1 than in the case C2. In other words, in terms of the sampling theorem, the condition in the case C1 is stricter than in the case C2. Therefore, when the sampling theorem is satisfied in the case C1, the sampling theorem is allowed to be satisfied in any other arrangements.

In this example, the pitch P and the pitch d are determined to satisfy the expression (1); however, typically, when the pitch P and the pitch d are determined so as to satisfy the following expression, the condition of the sampling theorem is allowed to be satisfied.

$$P \geq 2\sqrt{2}d \quad (2)$$

In the authentication mode M2, the touch panel 1 acquires the authentication code CC from the authentication card 9 held over the touch detection surface. At this time, first, the authentication section 35 identifies the synchronization pattern P1, based on the touch information IT, and determines a position where the authentication card 9 is held over the touch detection surface in the touch detection surface and the orientation of the authentication card 9. After that, the authentication section 35 acquires the data pattern P2, and acquires the authentication code CC based on the data pattern P2 to perform authentication with use of the authentication code CC.

Figure 9:
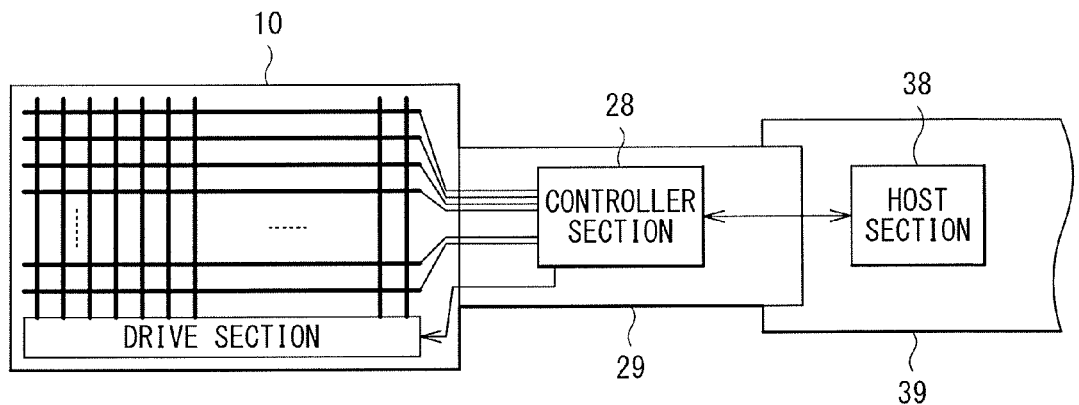
FIG. 9 is an explanatory diagram illustrating a mounting example of the touch panel illustrated in FIG. 1.

FIG. 9 illustrates a mounting example of the touch panel 1. In this example, the analog signal processing section 20 is mounted as a controller section 28 on a flexible printed circuit board 29, and the digital signal processing section 30 is mounted as a host section 38 on a substrate 39. It is to be noted that mounting of the touch panel 1 is not limited thereto, and a part or a whole of the digital signal processing section 30 may be mounted as the controller section 28 together with the analog signal processing section 20.

Here, the map data MAP corresponds to a specific example of "first data map" or "second data map" in an embodiment of the present disclosure. The touch component extraction section 31 corresponds to a specific example of "map generation section" in an embodiment of the present disclosure. A pattern corresponding to the synchronization pattern P1 in the map data MAP corresponds to a specific example of "fixed pattern" in an embodiment of the present disclosure. The authentication code CC corresponds to a specific example of "data code" in an embodiment of the present disclosure. The authentication section 35 corresponds to a specific example of "data acquisition section" in an embodiment of the present disclosure. The command issuing section 34 corresponds to a specific example of "touch detection section" in an embodiment of the present disclosure. The synchronization pattern P1 corresponds to a specific example of "first recording portion" in an embodiment of the present disclosure. The data pattern P2 corresponds to a specific example of "second recording portion" in an embodiment of the present disclosure.

[Operation and Functions]

Next, an operation and functions of the touch panel 1 according to this embodiment will be described below.

(Outline of Entire Operation)

First, an outline of an entire operation of the touch panel 1 will be described below referring to FIG. 1. The drive section 13 sequentially applies the drive signal DRV to the plurality of drive electrodes 11, based on the control signal supplied from the control section 27. The drive signal DRV is transmitted to the sensor electrodes 12 through the capacitance between the drive electrodes 11 and the sensor electrodes 12 to be output as the detection signal SDET from the touch detection device 10. The analog signal processing section 20 generates the map data MAP1 indicating detection results in all touch sensors in the touch detection surface of the touch detection device 10, based on the detection signals SDET supplied from the plurality of sensor electrodes 12 of the touch detection device 10.

In the touch detection mode M1, the digital signal processing section 30 determines the number of touches, the touch position, the change in each touch position, and the like, based on the map data MAP1, and issues a command. In the authentication mode M2, the digital signal processing section 30 acquires the authentication code CC, based on the map data MAP1 to perform authentication. More specifically, the touch component extraction section 31 generates the map data MAP of the touch component TC, based on the map data MAP1. The touch position detection section 32 detects the number of touches, the touch position, and the like, based on the map data MAP. In the touch detection mode M1, the tracking section 33 performs tracking processing, based on information such as the number of touches and the touch position detected in the touch position detection section 32 to generate the touch information IT. Moreover, in the authentication mode M2, the tracking section 33 outputs information supplied from the touch position detection section 32 as it is as the touch information IT. In the touch detection mode M1, the command issuing section 34 performs gesture recognition, based on the touch information IT, and issues a command. In the authentication mode M2, the authentication section 35 acquires the authentication code CC of the authentication card 9, based on the touch information IT, and performs authentication with use of the authentication code CC.

Next, operations of the digital signal processing section 30 in the touch detection mode M1 and the authentication mode M2 will be described below.

(Specific Operation in Touch Detection Mode M1)

Figure 10:
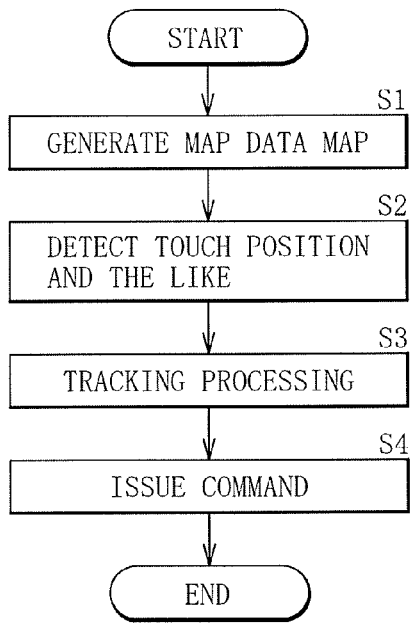
FIG. 10 is a flow chart illustrating an operation example of the touch panel in a touch detection mode.

FIG. 10 illustrates the operation of the digital signal processing section 30 in the touch detection mode M1. The digital signal processing section 30 performs the following operation every time scanning is performed in the touch detection device 10 and the map data MAP1 is supplied from the analog signal processing section 20.

First, the touch component extraction section 31 generates, based on the map data MAP1 supplied from the analog signal processing section 20, the map data MAP of a component (the touch component TC) based on the external proximity object (step S1). More specifically, the touch component extraction section 31 determines a difference between each digital code in the map data MAP1 supplied from the analog signal processing section 20 and each digital code in the map data MAP0 stored in the memory 36. Then, the touch component extraction section 31 calculates, based on the difference, the touch component TC whose value is close to 0 (zero) in a case where the external proximity object is not present and is increased when the external proximity object comes closer, thereby generating the map data MAP.

Next, the touch position detection section 32 detects the number of touches, the touch position, and the like, based on the map data MAP (step S2). More specifically, first, the touch position detection section 32 compares the value of a digital code included in the map data MAP to a predetermined threshold value to perform binarization on the digital code, thereby generating map data. In other words, the touch position detection section 32 removes so-called Gaussian noise by this binarization. Then, the touch position detection section 32 detects the number of touches, the touch position, and the like by performing isolated point removal, labeling processing, centroid processing, and the like, based on the map data.

Next, the tracking section 33 performs tracking processing, based on information such as the number of touches and the touch position detected in the touch position detection section 32 (step S3). More specifically, the tracking section 33 performs so-called neighborhood processing to associate each touch position obtained by latest scanning and each touch position obtained by scanning previous to the latest scanning with each other. Thus, the tracking section 33 determines a change in each touch position. Then, the tracking section 33 supplies information about the number of touches and the touch position and information about the change in each touch position as touch information IT to the command issuing section 34.

Next, the command issuing section 34 performs gesture recognition, based on the touch information IT to issue a command (step S4). More specifically, the command issuing section 34 recognizes an operation (for example, a tap, a swipe, a flick, or the like) performed by the user, based on the touch information IT, and issues a command according to a result of the recognition.

Thus, an operation flow in the touch detection mode M1 is completed.

(Specific Operation in Authentication Mode M2)

Figure 11:
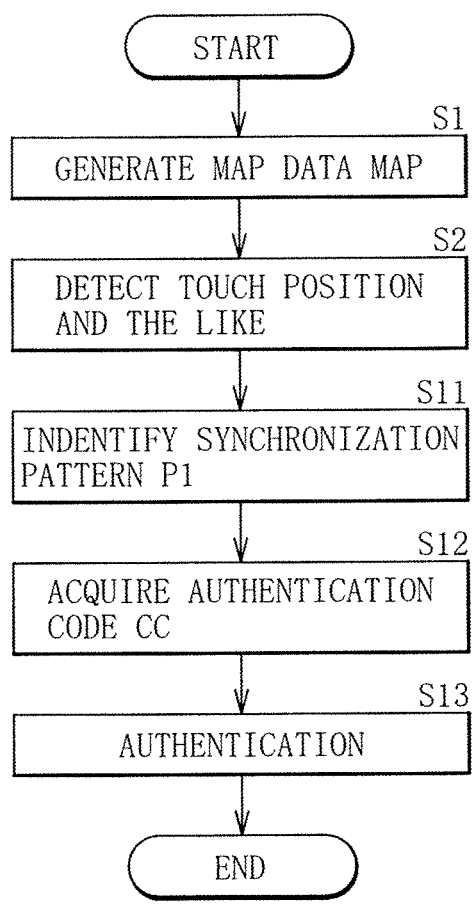
FIG. 11 is a flow chart illustrating an operation example of the touch panel in the authentication mode.

FIG. 11 illustrates an operation of the digital signal processing section 30 in the authentication mode M2. The digital signal processing section 30 performs scanning in the touch detection device 10, and performs the following operation every time scanning is performed in the touch detection device 10 and the map data MAP1 is supplied from the analog signal processing section 20.

First, as with the steps S1 and S2 in FIG. 10, the touch component extraction section 31 generates, based on the map data MAP1, the map data MAP of the component (the touch component TC) based on the external proximity object, and the touch position detection section 32 detects the number of touches, the touch position, and the like, based on the map data MAP. The tracking section 33 supplies information supplied from the touch position detection section 32 as it is as the touch information IT to the authentication section 35.

Next, the authentication section 35 identifies the synchronization pattern P1, based on the touch information IT (step S11). The authentication section 35 determines a position where the authentication card 9 is held over in the touch detection surface or the orientation of the authentication card 9 by the synchronization pattern P1.

Next, the authentication section 35 acquires the authentication code CC (step S12). More specifically, the authentication section 35 determines a portion where the data pattern P2 is supposed to be placed, based on the position and the orientation of the authentication card 9 determined in the step S11 to acquire the data pattern P2. Then, the authentication section 35 acquires the authentication code CC, based on the data pattern P2.

Then, the authentication section 35 performs authentication with use of the authentication code CC acquired in the step S12 (step S13).

Thus, an operation flow in the authentication mode M2 is completed.

Since the synchronization pattern P1 is provided to the authentication card 9 in such a manner, the data pattern P2 is allowed to be easily acquired. In other words, typically, the touch panel is used in various electronic apparatuses, and the touch detection surface of the touch panel varies in size. Since the size of the touch panel does not necessarily coincide with the size of the authentication card 9, in terms of usability, it is desirable that the authentication code CC be readable even if the authentication card 9 is held over any position in the touch detection surface. In the present application, the synchronization pattern P1 is provided to the authentication card 9, and when the touch panel 1 identifies the synchronization pattern P1, the position and the orientation of the authentication card 9 in the touch detection surface is allowed to be ascertained; therefore, the data pattern P2 is allowed to be easily acquired.

Moreover, in the authentication card 9, the conductor 91 and the nonconductor 92 are formed in the internal layer of the authentication card 9 so as not be viewed from outside; therefore, a possibility that the authentication code CC is known by a stranger is allowed to be reduced. In other words, for example, in a case where a scratch card is used, and the authentication code CC printed on the scratch card is concealed with a protection seal, there is a possibility that the authentication code CC is known by a stranger by removing the protection seal. On the other hand, in the present application, the conductor 91 and the nonconductor 92 are formed in the internal layer of the authentication card 9; therefore, the possibility that the authentication code CC is known by the stranger is allowed to be reduced.

Further, in the touch panel 1, the authentication code CC is acquired by reading the pattern of the conductor 91 and the nonconductor 92; therefore, for example, compared to a case where the user acquires the authentication code CC by removing the protection seal of the scratch card, and inputs the authentication code CC to an electronic apparatus, it is not necessary to input the authentication code. Therefore, authentication is easily performed, and usability is allowed to be improved.

Furthermore, typically, it is desirable that the pitch P of the conductor 91 and the nonconductor 92 in the authentication card 9 be set large so as to allow the touch panel with various detection resolutions to easily satisfy the condition of the sampling theorem. On the other hand, for example, the pitch P of the conductor 91 and the nonconductor 92 in the authentication card 9 may be set small so as to allow only a touch panel with high detection resolution to satisfy the condition of the sampling theorem. More specifically, for example, in a case of an electronic apparatus including a touch panel with extremely high detection resolution, the authentication card 9 that is available only for the electronic apparatus is allowed to be formed by sufficiently reducing the pitch P of the conductor 91 and the nonconductor 92 in the authentication card 9.

[Effects]

As described above, in this embodiment, since the synchronization pattern is provided to the authentication card, the data pattern is allowed to be easily acquired.

Moreover, in this embodiment, since the conductor and the nonconductor are formed in the internal layer of the authentication card so as not to be viewed from outside, the possibility that the authentication code is known by a stranger is allowed to be reduced.

Further, in this embodiment, since the authentication code is acquired by reading the pattern of the conductor and the nonconductor, and authentication is performed with use of the authentication code, it is not necessary for the user to input the authentication code. Therefore, authentication is allowed to be easily performed, and usability is allowed to be improved.

Modification Example 1

Figure 12A:
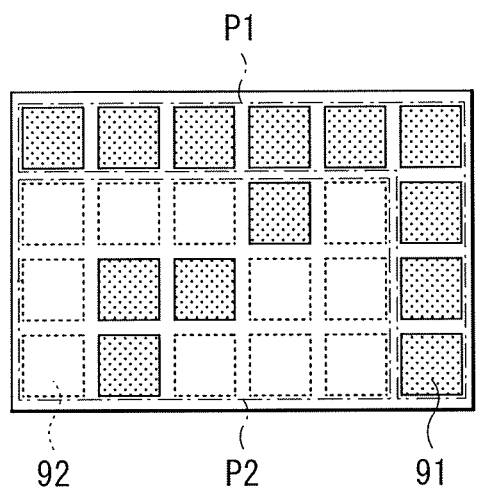
FIG. 12A is an explanatory diagram illustrating an example of an arrangement pattern of a conductor and a nonconductor according to a first modification example.
Figure 12B:
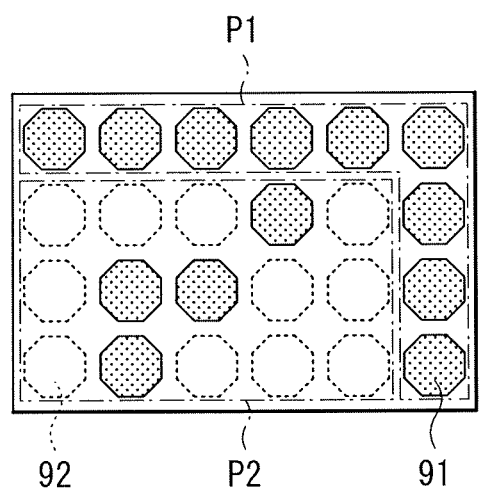
FIG. 12B is an explanatory diagram illustrating another example of the arrangement pattern of the conductor and the nonconductor according to the first modification example.

In the above-described embodiment, each of the conductor 91 and the nonconductor 92 has a circular shape; however, the shapes of the conductor 91 and the nonconductor 92 are not limited thereto. Alternatively, for example, each of the conductor 91 and the nonconductor 92 may have a square shape or a rectangular shape, or a polygonal shape such as a hexagonal shape or an octagonal shape. FIG. 12A illustrates a case where each of the conductor 91 and the nonconductor 92 has a square shape, and FIG. 12B illustrates a case where each of the conductor 91 and the nonconductor 92 has an octagonal shape.

Modification Example 2

Figure 13A:
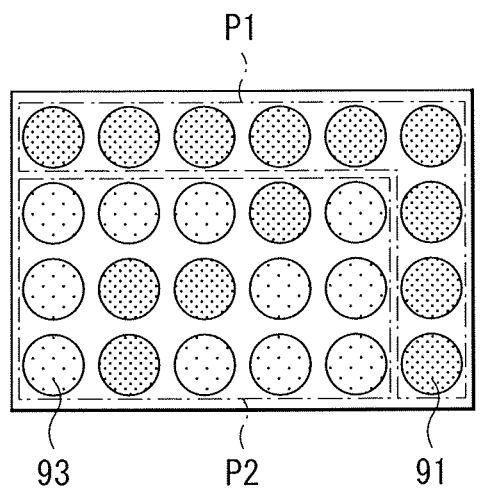
FIG. 13A is an explanatory diagram illustrating an example of an arrangement pattern of a conductor and a nonconductor according to a second modification example.
Figure 13B:
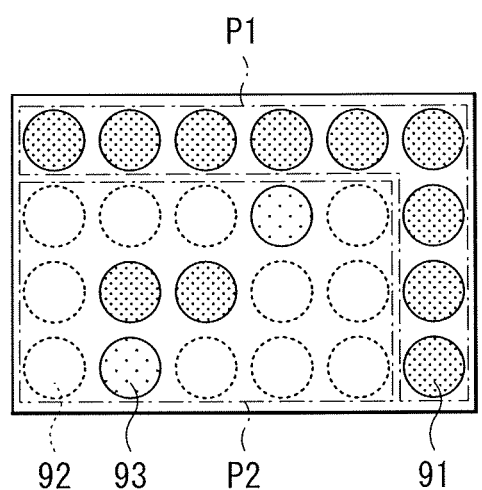
FIG. 13B is an explanatory diagram illustrating another example of the arrangement pattern of the conductor and the nonconductor according to the second modification example.

In the above-described embodiment, the pattern of the authentication card 9 is formed with use of the conductor 91 and the nonconductor 92; however, the pattern of the authentication card 9 is not limited thereto, and a plurality of conductors that differs in conductivity from one another may be used. More specifically, for example, as illustrated in FIG. 13A, the pattern may be formed with use of conductors 91 and 93 that differ in conductivity from each other, or, for example, as illustrated in FIG. 13B, the pattern may be formed with use of conductors 91 and 93 that differ in conductivity from each other, and the nonconductor 92. In this case, for example, the touch position detection section 32 may convert the digital code included in the map data MAP into a multivalued code by comparing a value of the digital code with a plurality of predetermined threshold values to generate map data. Thus, the conductors 91 and 93 that differ in conductivity from each other are allowed to be identified.

Modification Example 3

Figure 14:
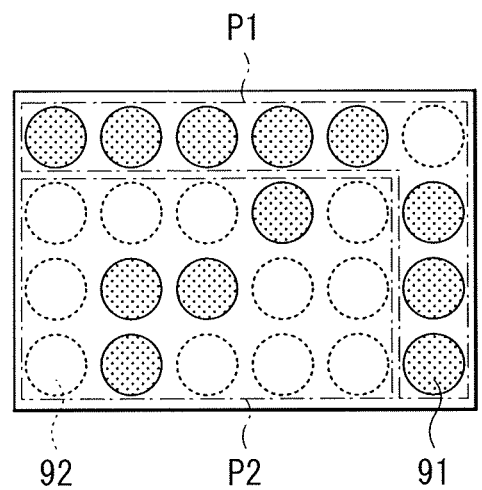
FIG. 14 is an explanatory diagram illustrating an example of an arrangement pattern of a conductor and a nonconductor according to a third modification example.

In the above-described embodiment, the synchronization pattern P1 is formed with use of only the conductor 91; however, the synchronization pattern P1 is not limited thereto. Alternatively, for example, as illustrated in FIG. 14, the synchronization pattern P1 may be formed with use of the conductor 91 and the nonconductor 92.

Modification Example 4

Figure 15:
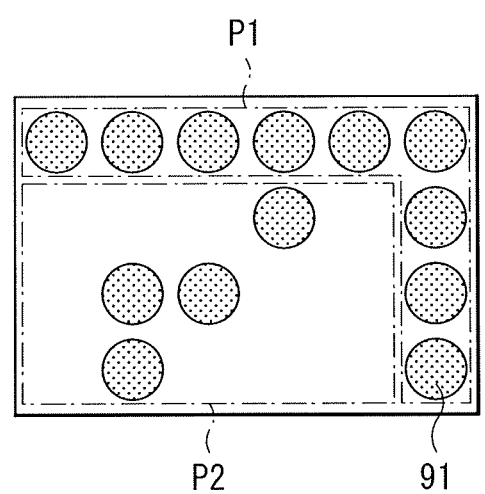
FIG. 15 is an explanatory diagram illustrating an arrangement pattern of a conductor according to a fourth modification example.

In the above-described embodiment, the pattern of the authentication card 9 is formed with use of the conductor 91 and the nonconductor 92; however, the pattern of the authentication card 9 is not limited thereto. Alternatively, as illustrated in FIG. 15, the pattern may be formed with use of the conductor 91 formed in the internal layer of a card that is a nonconductor.

Modification Example 5

In the above-described embodiment, the authentication card 9 is used as a prepaid card; however, the authentication card 9 is not limited thereto. Alternatively, for example, the authentication card 9 may be used as electronic money, a rewards card that manages points according to a customer's purchase amount in commercial transactions, or an authentication card used to release a security lock on a smartphone.

2. Application Examples

Next, application examples of the touch panels described in the above-described embodiment and modification examples will be described below.

Figure 16:
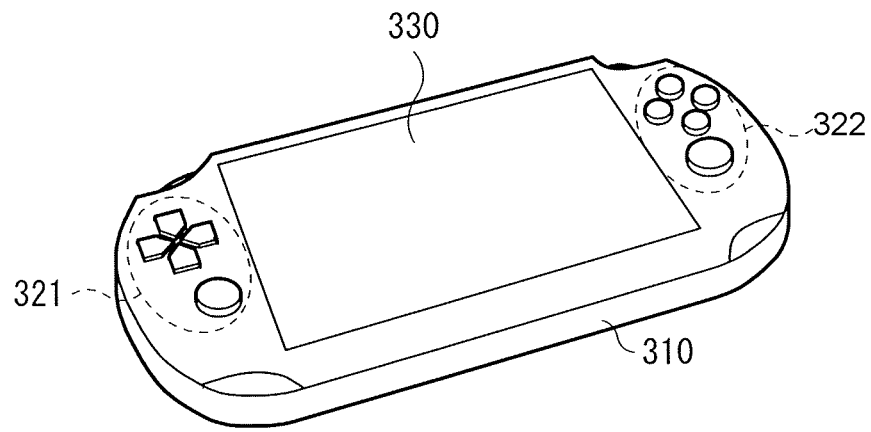
FIG. 16 is a perspective view illustrating an appearance of a portable game machine to which the touch panel illustrated in FIG. 1 is applied.

FIG. 16 illustrates an appearance of a portable game machine to which any of the touch panels according to the above-described embodiment and the like is applied. The portable game machine may include, for example, a main body 310, operation sections 321 and 322, and a display section 330. Any one of the touch panels according to the above-described embodiment and the like is applied to the display section 330.

In this case, the authentication card 9 may be used as a trading card. In other words, a so-called rare item is allowed to be acquired in a game by performing authentication with use of the authentication card 9.

Figure 17:
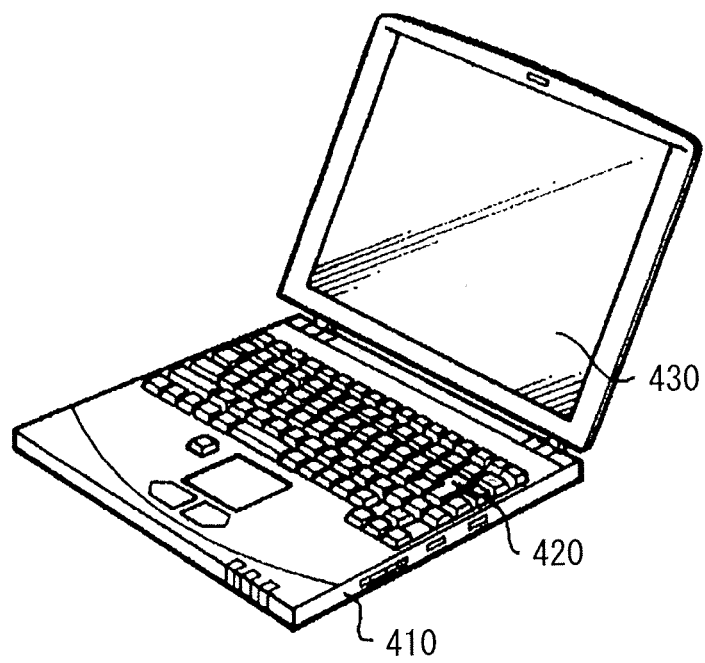
FIG. 17 is a perspective view illustrating an appearance of a notebook personal computer to which the touch panel illustrated in FIG. 1 is applied.

FIG. 17 illustrates an appearance of a notebook personal computer to which any of the touch panels according to the above-described embodiment and the like is applied. The notebook personal computer may include, for example, a main body 410, a keyboard 420, and a display section 430.

Any one of the touch panels according to the above-described embodiment and the like is applied to the display section 430.

The touch panels according to the above-described embodiment and the like are applicable to electronic apparatuses in any fields such as portable music players, digital cameras, and video cameras in addition to smartphones, portable game machines, and notebook personal computers. In other words, the touch panels according to the above-described embodiment and the like are applicable to electronic apparatuses in any fields that display an image.

Although the present application is described referring to the embodiment, the modification examples thereof, and the application examples thereof to electronic apparatuses, the present application is not limited thereto, and may be variously modified.

For example, in the above-described embodiment and the like, the synchronization pattern P1 is configured of eight conductors 91 in the top portion and the right portion as illustrated in FIG. 6 and the like; however, the synchronization pattern P1 is not limited thereto, and the synchronization pattern P1 may be configured of the conductor 91 in any portion. In other words, since the synchronization pattern P1 is used to determine the position where the authentication card 9 is held over in the touch detection surface and the orientation of the authentication card 9, as long as this purpose is allowed to be satisfied, the synchronization pattern P1 may be configured of any pattern.

Moreover, for example, in the above-described embodiment and the like, the authentication code CC with 15 bits is recorded in the data pattern P2; however, the present application is not limited thereto. Alternatively, the authentication code CC with 16 or more bits or 14 or less bits may be recorded. In this case, for example, the number of the conductors 91 and the number of the nonconductors 92 may be changed, or a plurality of bits may be assigned to one address by using a plurality of conductors that differ in conductivity from one another.

Further, for example, in the above-described embodiment and the like, the touch panel is configured alone; however, the present application is not limited thereto. Alternatively, for example, a display panel and the touch panel may be combined as one unit to configure a display panel with a touch detection function. More specifically, for example, a so-called on-cell type display panel in which the touch detection device is formed directly on a display surface of the display panel, or a so-called in-cell type display panel in which the touch detection device is formed in the display panel may be configured.

Furthermore, for example, in the above-described embodiment and the like, the operation modes (the touch detection mode M1 and the authentication mode M2) are switched; however, the present application is not limited thereto. Alternatively, typically, for example, in a case where, while touch detection is performed as with the operation in the above-described touch detection mode M1, the synchronization pattern P1 is detected, and the synchronization pattern P1 is identified, acquisition of the authentication code CC or the like may be performed.

It is to be noted that the present application may have the following configurations.

(1) A touch panel including:
a touch detection device;
a map generation section configured to generate a first data map including a fixed pattern and a data pattern, based on a signal output from the touch detection device according to an information recording medium placed in proximity to the touch detection device; and a data acquisition section configured to identify the fixed pattern, and acquire a data code from the data pattern, based on a result of identifying the fixed pattern.

(2) The touch panel according to (1), in which the data acquisition section determines, based on an address in the data pattern of a pattern component in the data pattern, data of a bit corresponding to the address in the data code.

(3) The touch panel according to (1) or (2), in which
the map generation section further generates a second data map, based on a signal output from the touch detection device according to a touch by a user, and
the touch panel further comprises a touch detection section configured to detect the touch by the user, based on the second data map.

(4) The touch panel according to (3), in which
the touch panel has a first operation mode and a second operation mode,
the touch detection section detects a touch in the first operation mode, and
the data acquisition section acquires the data code in the second operation mode.

(5) The touch panel according to any one of (1) to (4), in which the touch detection device is a capacitance detection device.

(6) An information recording medium including:
a first recording portion in which a plurality of conductors are arranged in a fixed pattern; and
a second recording portion in which one or a plurality of conductors are arranged in a pattern corresponding to recording data.

(7) The information recording medium according to (6), in which
the information recording medium is a card, and
the first recording portion and the second recording portion are disposed in an internal layer of the card.

(8) The information recording medium according to (6) or (7), in which the plurality of conductor include two conductors that differs in conductivity from each other.

(9) An information acquisition method including:
generating a first data map including a fixed pattern and a data pattern, based on a signal output from a touch detection device according to an information recording medium placed in proximity to the touch detection device; and
identifying the fixed pattern, and acquiring a data code from the data pattern, based on a result of identifying the fixed pattern.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A touch panel comprising:
a touch detection device;
a map generation section configured to generate a first data map including a fixed pattern and a data pattern, based on a signal output from the touch detection device according to an information recording medium placed in proximity to the touch detection device; and
a data acquisition section configured to identify the fixed pattern, and acquire a data code from the data pattern, based on a result of identifying the fixed pattern,
wherein the fixed pattern allows determining a position and an orientation in which the information recording medium is held over the touch detection device, and
the data acquisition section determines, based on an address in the data pattern of a pattern component in the data pattern, data of a bit corresponding to the address in the data code,
wherein the information recording medium comprises:
a first recording portion in which a plurality of first conductors are arranged in the fixed pattern; and
a second recording portion in which one or a plurality of second conductors are arranged in the pattern corresponding to recording data, wherein the plurality of second conductors comprise two conductors that differ in conductivity from each other.

2. The touch panel according to claim 1, wherein the map generation section further generates a second data map, based on a signal output from the touch detection device according to a touch by a user, and the touch panel further comprises a touch detection section configured to detect the touch by the user, based on the second data map.

3. The touch panel according to claim 2, wherein the touch panel has a first operation mode and a second operation mode, the touch detection section detects a touch in the first operation mode, and the data acquisition section acquires the data code in the second operation mode.

4. The touch panel according to claim 1, wherein the touch detection device is a capacitance detection device.

5. The information recording medium according to claim 1, wherein the information recording medium is a card, and the first recording portion and the second recording portion are disposed in an internal layer of the card.

6. An information acquisition method comprising:
generating, by a map generation section, a first data map including a fixed pattern and a data pattern, based on a signal output from a touch detection device according to an information recording medium placed in proximity to the touch detection device;
identifying the fixed pattern, and acquiring a data code from the data pattern, based on a result of identifying the fixed pattern;
determining, based on the fixed pattern, a position and an orientation in which the information recording medium is held over the touch detection device; and
determining, by a data acquisition section, based on an address in the data pattern of a pattern component in the data pattern, data of a bit corresponding to the address in the data code,
wherein the information recording medium comprises:
a first recording portion in which a plurality of first conductors are arranged in the fixed pattern; and
a second recording portion in which one or a plurality of second conductors are arranged in the pattern corresponding to recording data, wherein the plurality of second conductors comprise two conductors that differ in conductivity from each other.

* * * * *